United States Patent [19]

Cronk

[11] 4,186,948
[45] Feb. 5, 1980

[54] PIPE JOINT CLAMP

[76] Inventor: Allan D. Cronk, 950, Greenwood Rd., West Vancouver, British Columbia, Canada, V7S 1X7

[21] Appl. No.: 947,378

[22] Filed: Oct. 2, 1978

[51] Int. Cl.² .................. F16L 17/04; F16L 21/06; F16L 33/08
[52] U.S. Cl. .................. 285/177; 24/274 R; 285/236; 285/373
[58] Field of Search .............. 285/236, 369, 373, 177, 285/365–367, 322, 424; 24/274 R, 274 P, 279–282, 284; 138/99

[56] References Cited

U.S. PATENT DOCUMENTS

| | | | |
|---|---|---|---|
| 722,029 | 3/1903 | Mann | 285/322 X |
| 925,033 | 6/1909 | Sappenfield | 285/177 |
| 1,374,866 | 4/1921 | Spencer | 285/177 |
| 1,459,126 | 6/1923 | Widiger | 285/363 X |
| 2,322,213 | 6/1943 | Amberg | 285/177 X |
| 2,958,549 | 11/1960 | Spafford | 24/274 R |
| 3,212,799 | 10/1965 | Rice | 285/423 X |
| 3,325,195 | 6/1967 | Margis | 285/369 X |
| 3,359,017 | 12/1967 | Schaub | 285/236 |
| 3,600,770 | 8/1971 | Halling | 24/279 |
| 4,026,586 | 5/1977 | Kennedy, Jr. et al. | 285/236 |

FOREIGN PATENT DOCUMENTS

| | | | |
|---|---|---|---|
| 935465 | 10/1973 | Canada | 285/236 |
| 112634 | 3/1899 | Fed. Rep. of Germany | 285/322 |
| 2227177 | 1/1974 | Fed. Rep. of Germany | 24/274 R |
| 322659 | 4/1970 | Sweden | 285/365 |
| 1108810 | 4/1968 | United Kingdom | 285/424 |

*Primary Examiner*—Mervin Stein
*Assistant Examiner*—Carl F. Pietruszka
*Attorney, Agent, or Firm*—Townsend and Townsend

[57] ABSTRACT

A generally circular pipe joint clamp able to compress a flexible packer around a joint between substantially aligned pipes. The clamp comprises a plurality of plates forming a flexible shield. Each plate overlaps one neighboring plate and underlies the other neighboring plate. There is a joint in between each pair of neighboring plates except the plates at each end of the flexible shield to allow the plates to pivot relative to each other. Clamps allow a compressing force to be applied to the flexible shield.

7 Claims, 5 Drawing Figures

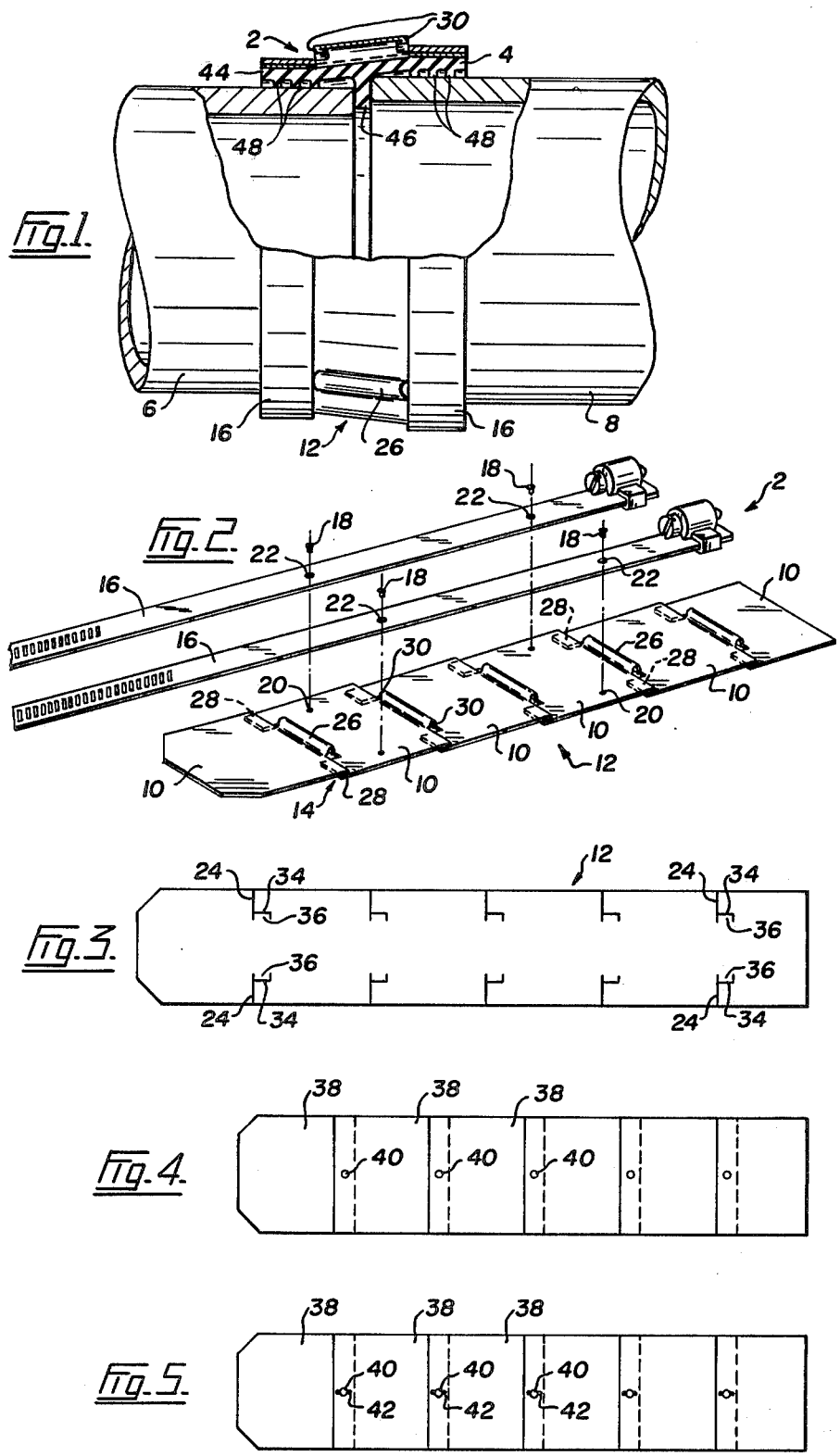

PIPE JOINT CLAMP

FIELD OF THE INVENTION

This invention relates to a pipe joint clamp.

DESCRIPTION OF THE PRIOR ART

It is possible to make pipes, conduits and similar fittings to close, reproducible tolerances. Such pipes are produced in steel, aluminum and copper. However, other pipes are manufactured by processes that cannot yield pipes of constant dimensions. These pipes and fitting include cast iron soil pipes, asbestos cement pipes and ceramic pipes.

If the pipes and fittings of variable dimensions are to be used as produced, which is clearly desirable economically and is the case at all times with cast iron soil pipes and fittings, the permitted tolerances are usually defined by various national standards. The casting methods with the above pipes and fittings may also be such that the cross section is not properly circular, even though a perfectly circular cross section is the ideal.

Although there are many couplings available to connect pipes and fittings having close, reproducible tolerances, the field is more limited in pipes and fittings of a second group in which there is a variation in the cross section of the pipes and fittings as produced.

A pipe joint that has proved extremely successful commercially is described and claimed in U.S. Pat. No. 3,233,922 issued to Evans on Feb. 8th, 1966. This joint features a resilient rubber sleeve drawn over the pipe or fitting and clamped in place by a clamping band of a semi-stiff, flexible sheet material. The design is such that the pipe joint produces a good water tight joint easily despite differences in external diameter or cross section in the sections of the pipes to be joined.

However, a disadvantage of the pipe joint of the above patent is that hammering of the joint, particularly hammering of the tighening straps to force the straps into their useful positions, can flatten the corrugations and reduce the effectiveness of the pipe joint.

SUMMARY OF THE INVENTION

The present invention seeks to produce a pipe joint clamp in which this problem is solved. The present invention, although it can be used to connect pipes having constant cross section, is principally to permit the joining of pipes and fittings of the above second group, that is in which the dimensions cannot be guaranteed.

Accordingly, in a first aspect, the present invention is a generally circular pipe joint clamp able to compress a flexible packer around a joint between substantially aligned pipes, the clamp comprising a plurality of plates forming a flexible shield, each plate overlapping one neighbouring plate and underlying the other neighbouring plate, a connection between each pair of neighbouring plates, except the plates at each end of the flexible shield, to allow the plates to pivot relative to each other; and clamping means to allow a compressing force to be applied to the flexible shield.

The connection between each pair of neighbouring plates except the plates at each end of the flexible shield, may be, for example, a single rivet at about the middle of each connection between neighbouring plates. The rivet may engage elongated holes in the neighbouring plates to permit variation in the amount of overlap of the plates and thus of the circumference of the flexible shield.

In a preferred embodiment each connection comprises two aligned slits, one adjacent each side of the flexible shield and a channel opening inwardly, formed between a line of slits, with the overlapping portions at each end of the channel. Such a connection desirably has turned over, reinforcing lips at each end of each channel, adjacent each slit.

BRIEF DESCRIPTION OF THE DRAWINGS

The invention is illustrated, by way of example, in the accompanying drawings in which:

FIG. 1 is a view, partially broken away, of a pipe joint clamp according to the present invention in its useful position;

FIG. 2 is an exploded view of the pipe joint clamp of FIG. 1;

FIG. 3 illustrates the flexible shield of the pipe joint of FIG. 2 at a stage during its formation;

FIG. 4 illustrates an embodiment of a flexible shield useful in a joint clamp according to the invention;

FIG. 5 illustrates further variation of a flexible shield useful in a clamp according to the invention.

DESCRIPTION OF THE PREFERRED EMBODIMENTS

Referring to the drawings, FIG. 1 shows a generally circular pipe joint clamp 2 able to compress a flexible packer 4 around a joint between two substantially aligned pipes 6 and 8. The clamp 2 comprises, as shown particularly in FIG. 2, a plurality of plates 10 forming a flexible shield 12. Each plate 10 overlaps one neighbouring plate 10 and underlies the other neighbouring plate 10. There is a connection 14 between each pair of neighbouring plates 10 except the plates at each end of the clamping band 12. The connection 14 allows the plates 10 to pivot relative to each other. There are clamping means in the form of worm drive straps 16 positioned over each edge of the clamping band 12.

The straps 16 may be attached to the flexible shield 12 by rivets 18 extending through holes 20 in the flexible shields 12 and holes 22 in the straps 16. It is pointed out that the location of the straps 16 on the bands 12 in this way should be convenient for installing the pipe joint clamp 2 according to the invention but is not an essential part of the invention.

In the embodiment of FIG. 2 the connection 14 between each pair of neighbouring plates 10 comprises aligned slits 24 (see FIG. 3) one adjacent each side of the flexible shield 12. There is a channel 26 opening inwardly when the band is in its useful position between aligned pipes 6 and 8. There are overlapped portions 28 at each end of the channel 26. Channel 26 has turned under (see FIG. 1) reinforcing lips 30 at each end, adjacent overlapped portion 28. These lips 30 help in resisting flattening of the channels 26 by hammering straps 16 into place. However, it will be understood that the general shape of the channels 26 prevents this flattening.

FIG. 3 illustrates the formation of the flexible shield 12 of FIG. 2, which is a preferred flexible shield according to the invention. As illustrated in FIG. 3 slits 24 are formed at each side of the clamping band 12. Internal cuts 34 are formed. The internal cuts 34 together with the inner end of the slits 24 define a small portion 36 that may be turned under (see FIG. 1) to form the lips 30 in the clamping bands 12.

FIG. 4 illustrates an embodiment of the invention in which a plurality of plates 38 overlap one neighbouring plate 38 and underlie the other. In the embodiment of FIG. 4 there is a single rivet 40 at about the middle of each connection between neighbouring plates 38. The rivet 40 permits relative movement of the plates 38.

In the embodiment of FIG. 5 the holes receiving the rivets 40 are elongated as shown at 42.

The flexible packer shown in section in FIG. 1 is conventional. Typically it is made of neoprene and comprises a circular wall 44 having a central inner rib 46 that fits between pipes 6 and 8. Adjacent its ends the wall 44 is formed with smaller internal projections 48 that, when compressed by the pipe joint clamp 2, form a water-tight seal.

The pipe joint clamp according to the present invention is used conventionally. That is, when it is required to join the pipes 6 and 8 to each other, the flexible packer 4 is placed on pipe 6 and the pipe joint 2 is placed loosely over one of the pipes 6 and 8. The central rib 46 abuts the end of the pipe 6 as shown in FIG. 1. The other pipe 8 is then inserted inside the flexible packer 4 to the position shown in FIG. 1. The pipe joint clamp 2 is then positioned over the flexible packer 4 as shown in FIG. 1. The worm drive straps 16 are then tightened the required amount by use of a screw driver or torque wrench in conventional manner. The flexible packer 4 is compressed around the joint. Because of its flexibility it is able to take up differences in the external contours of the joint. Furthermore because the flexible shield 12 can alter its general configuration by relative movement of the plates 10 (or 38 in FIG. 4) the pipe joint clamp according to the invention is able to provide a uniform pressure over all the exterior of the joint.

The pipe joint clamp according to the invention may be made of conventional material acceptable to various local codes. Stainless steel, copper, aluminum and other metals are appropriate. Plastics and other similar inert materials would be acceptable.

I claim:

1. A generally circular pipe joint clamp adapted to compress a flexible packer around a joint between substantially aligned pipes, the clamp comprising a plurality of plates forming a flexible shield, each plate overlapping one neighbouring plate and underlying the other neighbouring plate,
   a joint in between each pair of neighbouring plates except the plates at each end of the flexible shield to allow the plates to pivot relative to each other; and
   clamping means to provide a compressing force to be applied to the flexible shield.

2. A pipe joint clamp as claimed in claim 1 in which the joint comprises a single rivet at about the middle of each joint between neighbouring plates.

3. A pipe joint clamp as claimed in claim 2 in which the rivet engages enlongated holes in the neighbouring plates to permit variation in the amount of overlap of the plates and thus of the circumference of the flexible shield.

4. A pipe joint clamp as claimed in claim 1 in which each joint comprises two aligned slits, one adjacent each side of the flexible shield and a channel opening inwardly, formed between aligned slits, with the overlapping portions at each end of the channel.

5. A pipe joint clamp as claimed in claim 4 in which each channel has turned over, reinforcing lips at each end, adjacent each slit.

6. A pipe joint clamp as claimed in claim 1 in which the clamping means comprises worm drive straps positioned over each edge of the flexible shield.

7. A pipe joint clamp as claimed in claim 6 in which the straps are attached to the flexible shield.